United States Patent [19]

Bourset et al.

[11] 4,211,384
[45] Jul. 8, 1980

[54] MOLDING ASSEMBLY FOR CASTING SOFT CONTACT LENSES

[75] Inventors: Claude Bourset, Creteil; William Lenne, Gagny, both of France

[73] Assignee: Essilor International (Cie Generale d'Optique), Creteil, France

[21] Appl. No.: 9,788

[22] Filed: Feb. 6, 1979

[30] Foreign Application Priority Data

Feb. 7, 1978 [FR] France .................. 78 03323

[51] Int. Cl.² .................. B29C 5/00; B29D 11/00
[52] U.S. Cl. ..................... 249/160; 425/808
[58] Field of Search .................. 249/160; 425/808

[56] References Cited

U.S. PATENT DOCUMENTS

| 3,211,811 | 10/1965 | Lanman | 425/808 |
| 3,475,521 | 10/1969 | Stroop | 425/808 |
| 3,915,609 | 10/1975 | Robinson | 425/808 |
| 4,113,224 | 9/1978 | Clark | 425/808 |
| 4,121,896 | 10/1978 | Shepherd | 425/808 |
| 4,138,086 | 2/1979 | Migutani et al. | 425/808 |

FOREIGN PATENT DOCUMENTS 1170917  9/1958  France .................. 425/808

Primary Examiner—J. Howard Flint, Jr.
Attorney, Agent, or Firm—Charles E. Brown

[57] ABSTRACT

A molding assembly for casting soft contact lenses especially such lenses formed of hydrophobic material. Such a molding assembly comprises a molding cavity defined by the dies of the assembly and an annular gasket or sealing member joining the peripheries thereof. The perimeter of largest diameter of the molding cavity is defined by contact between a sealing ridge which is part of the concave die or the gasket or sealing member and a bearing surface which is part of the other of the concave die or the gasket or sealing member.

The annular gasket or sealing member may have an annular skirt adapted to embrace the concave die in the closed position of the assembly.

The gasket or sealing member is carried by the convex die and may be integrally formed in one piece with the convex mold.

11 Claims, 11 Drawing Figures

MOLDING ASSEMBLY FOR CASTING SOFT CONTACT LENSES

TECHNICAL FIELD OF THE INVENTION

The present invention relates to the molding of contact lenses, and more particularly to contact lenses of flexible material.

BACKGROUND OF THE INVENTION

As is known a contact lens must comply with three functional requirements. First is its optical corrective function which is performed by the central area of the lens. Second, it must be adapted to the wearer's eye, at least in the so-called back off zone which is of greater or lesser extent and is usually situated at the periphery of the contact lens around the central area. The back off zone must define with the wearer's eye a wedge-shaped annular space adapted to facilitate the introduction of a new lacrymal film or tear layer under the contact lens each time the eyelid blinks thereby guaranteeing the sought-after adaptability to the wearer's eye. The functional requirement is wearer comfort particularly when the eyelid closes over the contact lens. It is the configuration of the peripheral margin of the contact lens which ensures wearer comfort too.

At the present the first and third above-mentioned functional requirements may be complied with in a generally satisfactory manner. As for the second functional requirement, wearer adaptability, such is not the case.

As regards so-called hard contact lens, the formation of a peripheral back off zone on the concave side of the contact lens does not create any special problems, as the desired configuration is obtained by grinding.

This is also the case with so-called soft contact lenses which are made of hydrophilic material as they can be ground in a dry state much in the same way as hard contact lenses. Such a substance commonly known under the designation Hema corresponding to hydroxyethyl-methacrylate is a flexible hydrophilic material which may be ground in a dry state.

Contrariwise with soft contact lenses of flexible hydrophobic material, such as silicon rubber, machining is not possible without contrivances for temporary rigidification by contrifugation or cooling, which is hard to perform on an industrial scale. Accordingly, contact lenses of hydrophobic material are cast in molds between two dies, one concave and the other convex.

French patent No. 70 37579 in the name of the assignees of the present application proposed apparatus for direct casting such a contact lens of flexible material into its ultimate desired configuration, whereby any touch ups by machining, which are always difficult to perform for the reasons set out above, are advantageously avoided.

In practice, with a casting apparatus according to the foregoing patent, an annular gasket or sealing member is employed which forms a junction between the dies of the mold at the periphery thereof, and cooperates with the dies to define a molding cavity corresponding to the desired contact lens.

Such a gasket or sealing member is therefore concerned with the concave as well as the convex face. The gasket or sealing member has a glove finger-like configuration extending between peripheries of substantially equal diameters, on the respective mold dies. The gasket or sealing member tapers to near zero thickness to merge tengentially with the dies at their peripheries.

Such an arrangement continues to provide satisfactory results. Nonetheless it has its drawbacks as follows.

First of all, because of its acute profile necessary for its tangential connection with the mold dies, the annular gasket or sealing member is not always easy to fabricate, and its tangential connection with the mold dies does not always provide the desired uniformity.

Moreover, and more importantly, such a sealing member or gasket with a glove finger section does not lead itself to the formation of the back off zone, which for reasons set forth above, is preferably situated at the periphery of the concave face.

As the back off zone is not obtainable with such a gasket or sealing member, it might have been contemplated to form it on the convex die of a complementary shape. Yet, at least for the time being, especially in the optically operative area, there are great practical difficulties if not the impossibility to grind an polish a convex mold die having a hollow circular ridge which forms the intersection of the central area of the contact lens with the peripheral back off zone thereof.

SUMMARY OF THE INVENTION

It is a general object of the present invention to provide a molding assembly for casting flexible or soft contact lenses which expedites and simplifies the formation of the entire desired back off zone at the periphery thereof along the concave face thereof, amongst other advantages.

According to the invention there is provided a contact lens casting assembly comprising a mold cavity defined by the concave and convex dies disposed opposite each other together with an annular gasket or sealing member which establishes a junction between the dies at their peripheries. The invention is characterized by the peripheral margin of largest diameter of the mold cavity being defined by the contact between a sealing ridge and a bearing surface, the sealing ridge being formed on one of the die members or the gasket or sealing member and the bearing surface being formed on the other of the members.

Although the sealing ridge may be part of the annular gasket or sealing member and the bearing surface part of the concave die, preferably, the opposite is the case, that is, the sealing ridge is part of the concave die and the bearing surface is part of the annular gasket or sealing member.

In this case the diameter of the lens is strictly defined by the rigid ridge on the concave die which guarantees high precision in the diameter of the lens and therefore faithful reproduction of the geometrical characteristics of the ultimate lens.

The novelty of the arrangement will be better understood by emphasizing that with the glove finger configuration of the gasket or sealing member as disclosed in the above identified French patent, it is the inner or closed end of the groove formed in the gasket or sealing member which determines the peripheral margin of the lens and therefore the ultimate diameter of the lens depends solely upon the gasket or sealing member.

In any event, thanks to the molding assembly according to the invention, the gasket or sealing member itself ensures the formation of the requisite back off zone on the contact lens for providing good wearer adaptability characteristics.

Furthermore it is advantageously possible to give this back off zone any desired configuration, so that for the same optical characteristics of a contact lens the optician may have at his disposal an entire range of contact lenses differing from one another by the configuration of their back off zones and select the one which is most apt to ensure good wearer adaptability.

Preferably the annular gasket or sealing joint partaking in defining the mold cavity to obtain the back off zone is formed by a segment of a single geometrical surface, namely, a plane, a cone, a sphere, a torus, or a series of such segments.

Evidently, however, the surface of the gasket or sealing member may have any desired configuration, e.g. a curve of progressively varying curvature.

According to an embodiment of the invention the gasket or sealing member forms a part distinct from the convex die and may, for example, embrace the latter.

Alternatively, the gasket or sealing member may be integrally formed with the convex die so as to constitute a single part. In this case such a part is formed by first molding the concave die, bearing in mind that although the machining of the convex surface is practically impossible this is not the case for the concave surface and thereby the machining of the desired back off zone along the initial molded concave die does not pose any particular problems.

Features and adavantages of the invention will become apparent from the description which follows, given by way of example, with reference to the accompanying diagrammatic drawings.

DETAILED DESCRIPTION OF THE PREFERRED EMBODIMENTS

Figure 1:
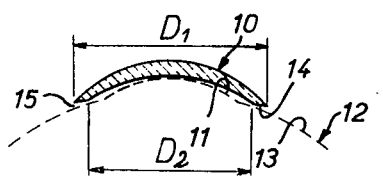
FIG. 1 is a cross-sectional view taken through the center of a contact lens cast with a molding assembly embodying the invention.

In FIG. 1 denoted by general reference numeral 10 is a contact lens which is adapted to be worn directly on the cornea 11 of the wearer's eyeball 12 shown in broken lines. As illustrated, the peripheral margin of the contact lens 10 must bear on the scleral zone 13 of the wearer's eye 12.

Of advantage in this case for satisfactory re-entry of lacrymal film or tear layer under the contact lens at each blinking of the eyelid, the contact lens 10 is provided generally along the periphery of its concave face with an inclined back off zone 14 adapted to form with te scleral zone 13 of the eye 12 an annular wedge-shaped space 15. As illustrated, the inclined back off zone 14 extends between the outermost perimeter of the contact lens having a diameter $D_1$ to an inner perimeter having a diameter $D_2$ defining the outer limits of a central optically active area of the contact lens.

The adaptability of the lens depends at least in part on the back off zone 14 of the contact lens; adaptability being the capacity of the wearer's eye to accommodate the contact lens with tolerance.

The formation of the back off zone 14 is what poses appreciable problems.

Figure 2:
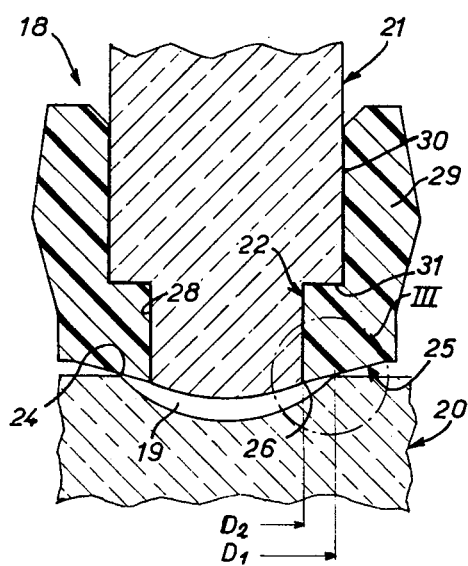
FIG. 2 is a fragmentary view in cross section of a molding assembly embodying the invention.

The molding assembly embodying the invention which is denoted by general reference numeral 18 in FIG. 2 obviates these problems. In a known manner, the molding assembly 18 embodying the invention comprises a molding cavity 19 defined together by the mold dies 20 and 21, the first having a concave molding surface and the other having a convex molding surface which are disposed opposite each other, and an annular gasket or sealing member 22 which establishes a junction between the mold dies 20, 21 at the outer peripheries of the molding surfaces.

According to the invention the outermost periphery of the molding cavity is defined by the contact between a sealing ridge and a bearing surface, the sealing ridge being part of sub-assembly formed of the concave die 20 and the annular gasket or sealing member 22, whereas the bearing surface is part of the other of the concave die 20 or the gasket or sealing member 22.

Figure 3:
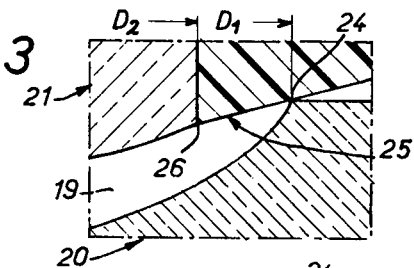
FIG. 3 is a fragmentary view of the part of the molding assembly in inset III in FIG. 2.

In the embodiment of FIGS. 2 and 3 the sealing ridge which bears reference numeral 24 is part of the concave die 20 and defines the outer periphery of the molding surface thereof, while the corresponding bearing surface designated by reference numeral 25 is part of the annular gasket or sealing member 22.

In the embodiment of FIGS. 2 and 3 the bearing surface 25 runs from the sealing ridge 26 which defines the inner periphery connected tangentially or otherwise to the outer periphery of the molding surface of the convex die 21 and continues radially beyond the sealing ridge 24. The sought-after back off zone is thus defined by the annular gasket or sealing member.

Figure 4:
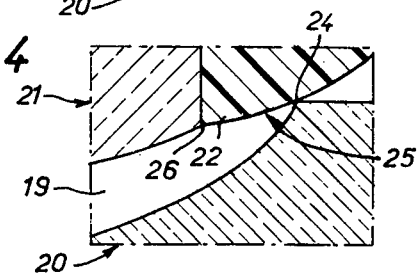
FIGS. 4–6 are views similar to that of FIG. 3 for modified embodiments.

In addition, in the embodiment of FIGS. 2 and 3, the bearing surface 25 is generally frustoconical so that the surface of the annular gasket or sealing member 22 which actually defines part of the molding cavity 19, that is, the bearing surface 25 on the gasket or sealing member which is defined between the inner and outer peripheries of the molding surfaces on the dies 19, 20, is entirely formed as a segment of a single surface of simple geometrical shape, i.e., a cone. On the other hand in the embodiment of FIG. 4 the surface is that of a torus. Yet, this is not mandatory. Indeed, such a surface may be made up of series of segments of simple geometrical surfaces.

Numerous variants may be contemplated, as to the nature of the simple geometrical surfaces employed to define the surface in question, which may also be spherical or planar, as well as to the number of successive segments of such a surface. Moreover, the surface may be of any desired curvature.

In any event, according to a feature of the invention, the surface of the annular gasket or sealing member 22, which in part defines the molding cavity 19 and corresponds to the back off zone 24 of the ultimate contact lens, extends between two circular perimeters 24, 26 of the molding cavity which together form the peripheries of the corresponding molding surfaces and have different diameters $D_1$ and $D_2$ respectively.

This feature distinguishes the annular gasket or sealing member 22 of the present molding assembly from that of the above mentioned French patent No. 70 37579 as well as annular sealing members which are employed in conventional molding assemblies in which the surface which defines part of the molding cavity is generally cylindrical and extends between two circular peripheries of the same diameter of the respective dies.

In the embodiment illustrated in FIG. 2 the annular gasket or sealing member 22 which is distinct from the convex molding die 21 itself directly embraces the convex molding die 21 and is force-fitted on the cylindrical surface 28 thereof.

Further, the annular gasket or sealing member 22 is integrally formed with a skirt 29 which is also received on the convex molding die 21 around a cylindrical surface 30 of greater diameter than the cylindrical surface 28. The cylindrical surfaces 28 and 30 are separated by a shoulder 31 on the convex molding die 21, the gasket or sealing member 22 bearing against the shoulder 31.

Thus in this case the annular gasket or sealing member 22 is fixed exclusively on the convex mold die 21 although it constitutes a part distinct therefrom.

After depositing a slight excess amount of casting material onto the molding surface of the concave die 20 the convex die 21 carrying the gasket or sealing joint 22 is moved towards the concave die 20 until the bearing surface 25 on the gasket or sealing joint 22 comes into contact with the sealing ridge 24 defining the periphery of the molding surface of the concave die 20.

In practice the closing movement of one of the dies relative to the other is adjusted so that the central areas of the molding surfaces are spaced a distance from each other corresponding to the thickness of the contact lens to be cast, the sealing ridge 24 slightly penetrating or deforming the gasket or sealing member, bearing in mind the relatively yieldable nature of the material constituting the same, without appreciably marking the gasket or sealing member.

Figure 5:
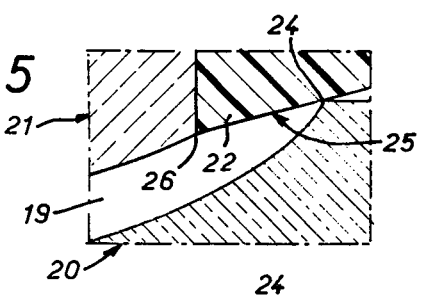

As illustrated in FIG. 5 the same type of gasket or sealing member may serve for casting lenses of different diameters. To this end it suffices to use a concave die 20 sized to the diameter $D_1$ of a desired contact lens, the diameter being defined by the sealing ridge 24 on the concave die.

Figure 6:
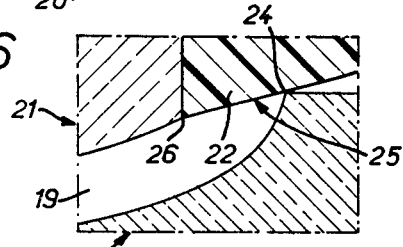

The molding surface of the concave die does not necessarily have a single radius or curvature, but on the contrary, as illustrated in the drawings, particularly FIG. 6, the radius of curvature of the molding surface in the vicinity of its sealing ridge may gradually diminish.

Figure 7:
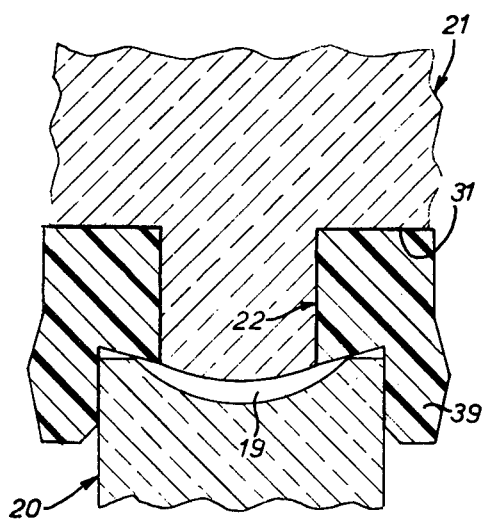
FIG. 7 is a view similar to that of FIG. 2 for an alternative embodiment.

In accordance with the embodiment of FIG. 7 the annular gasket or sealing member 22 is, as before, integrally formed with a skirt 39 but the skirt is received on the concave die 20 by means of a cylindrical surface 40 thereon. Thus, the combination of the sealing member 22 and its skirt 39 ensure the centering of the dies 20 and 21 relative to each other. Furthermore, the shoulder 31 of the convex die against which bears may be trued or ground if need be with a view to altering the height of the gasket or sealing member 22 relative to the molding surface of the convex die 21 to effect good continuity between the bearing surface 25 and the molding surface.

Figure 8:
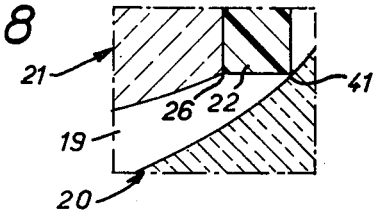
FIG. 8 is a view similar to that of FIG. 3 for a modified embodiment.

In accordance with a variant illustrated in FIG. 8, the sealing ridge is formed on the gasket or sealing member at the peripheral margin 41 thereof, and the bearing surface therefor is part of the concave die 20 and, for instance, in continuity with the concave molding surface.

In all of the preceding embodiments the gasket or sealing member 22 was a separate part. Such a sealing member or gasket may advantageously be molded of synthetic plastic material, such as a polyamide or polycarbonate; on the other hand the dies 20 and 21 with which they are associated are made of a material which may be polished with a polishing wheel, such as metal or glass, Pyrex glass being particularly suitable.

Figure 9:
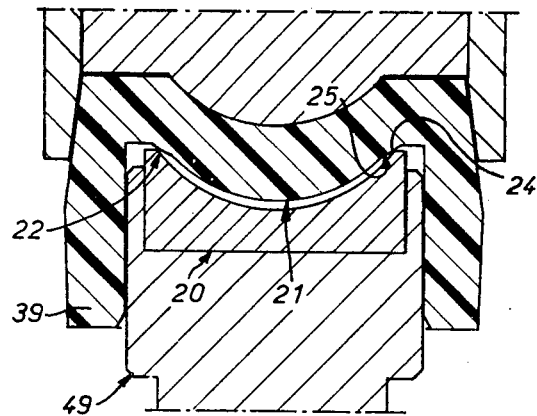
FIG. 9 is a view similar to that of FIG. 7 for an alternative embodiment.
Figure 10:
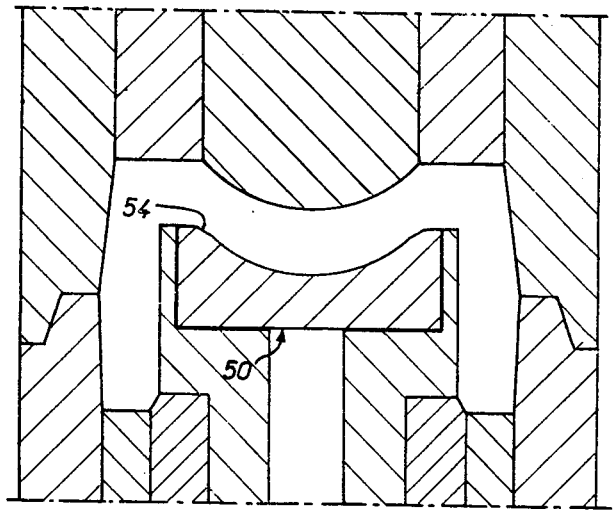
FIG. 10 is a cross-sectional view illustrating the casting of the gasket or sealing member for the molding assembly of the embodiment of FIG. 9.

According to the alternative embodiment of FIGS. 9 and 10, the gasket or sealing member 22 may be formed in one piece with the convex die 21 itself and advantageously molded of synthetic plastic material of the foregoing kind in one piece therewith. The molding of such a complex part does not pose any problems since the mold 50, used to form the surface of the part corresponding to the concave face of the desired contact lens, is itself concave, see FIG. 10, and therefore it is possible to machine the required back off zone 54.

In the illustrated embodiment of FIG. 9 the sealing member or gasket 22 is formed integrally, as above, with a skirt 32 which is received on the concave die 20, or as here, a support 49 therefor.

The reader will understand that what is referred to as the annular sealing member 22 is the part of the corresponding element in which the sought-after back off zone is formed.

In FIG. 9 the bearing surface 25 of such an annular sealing member is in line with the sealing ridge 24 which is generally convex.

Figure 11:
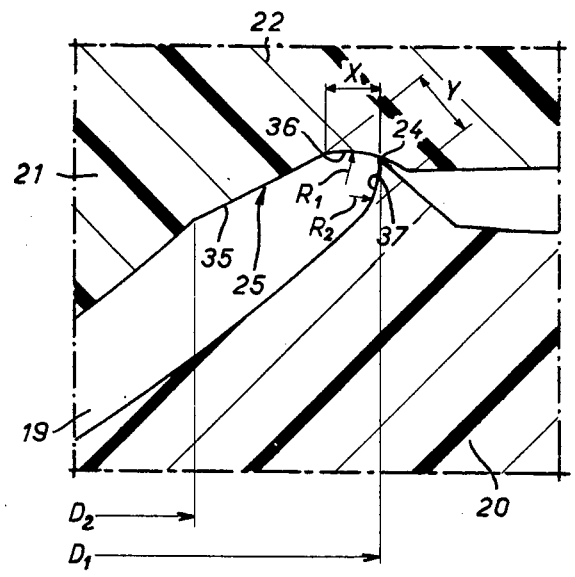
FIG. 11 is a view similar to FIG. 3 for modified embodiment.

According to the embodiment of FIG. 11 the bearing surface 25 comprises, in succession, starting from the outer diameter $D_2$, a first zone 35 which is adapted to form the major part of the back off zone of the lens to be cast and has an overall conical or large radius of curvature, convex configuration, and then substantially in line with the sealing ridge 24 a second zone 36 which is adapted to contribute in the formation of the edge of the lens and is generally concave.

Preferably the concave zone 36 is toroidal and the sealing ridge 24 is itself formed at the end of a concave toroidal zone 37 in the molding surface 20 having a meridian radius of curvature $R_2$ substantially equal to $R_1$ of the concave zone 36 of the bearing surface 25.

In normal practice it is constructed and arranged so that when the molding cavity 19 is closed as shown the sealing ridge 24 is substantially midway across the part of molding cavity comprising the toroidal concave zones 36 and 37.

The peripheral edge of the lens thus has, advantageously, an ogival cross section to ensure good wearer comfort.

In practice the part of the molding cavity 19 which comprises the toroidal concave zones 36 and 37 has a radial extension X which is a mere fraction of the outer diameter $D_1$, of the order of 1/100.

Thus for a diameter $D_1$ between 10 and 12 mm the radial extension X is of the order of 0.1 mm. In conjunction therewith the corresponding thickness Y, measured at the base of the toroidal concave zone 36 and 37 is between 0.05 and 0.08 mm, depending on the type of lens, and the radii $R_1$ and $R_2$ are between 0.15 and 0.40 mm. These numerical values are merely by way of example.

Moreover in the embodiment of FIG. 11 the die 20 is also of synthetic plastic material which means the machining the ridge of a concave molding surface. Also, as it is a peripheral zone for the lens to be case and therefore beyond the optically operative area no polishing is necessary, though such machining could in practice be accomplished under satisfactory conditions by means of a diamond tool.

The present invention is not intended to be limited to the described and illustrated embodiments but encompasses all alternatives, variations and modifications within the scope of the appended claims. It thus encompasses gasket or sealing member configurations which form an annular part of the molding cavity 19 corresponding to the sought-after back off zone. Moreover, the invention is applicable irrespective of the configuration of the lens, be it even toroidal or bitoroidal.

The invention is also applicable in the case the back off zone is to be provided on the convex face of the lens concerned; the concave die therefor may readily be machined accordingly.

What we claim is:

1. A molding assembly for casting soft contact lenses, comprising a concave die and a convex die disposed opposite each other and a resilient material gasket establishing a junction between the peripheries of the dies defining together a molding cavity, the outer perimeter of the molding cavity being defined by line contact between a sealing ridge and a bearing surface, the sealing ridge being part of one of the concave die and the annular gasket and the bearing surface being part of the other of the concave die and the resilient material gasket.

2. An assembly in accordance with claim 1, wherein the sealing ridge is part of the concave die and the bearing surface is part of the annular gasket.

3. An assembly in accordance with claim 1 or 2, the bearing surface extending radially beyond the sealing ridge.

4. An assembly in accordance with claim 1, wherein the bearing surface comprises a concave zone substantially in line with the sealing ridge.

5. An assembly in accordance with claim 1, wherein the concave part of the bearing surface is toroidal and the sealing ridge is formed at the end of a toroidal concave zone having a meridian radius substantially equal to the radius of the toroidal concave zone of the bearing surface.

6. An assembly in accordance with claim 2, said molding cavity being defined in part by a portion of the annular gasket comprising at least one segment of a simple geometrical surface.

7. An assembly in accordance with claim 2, wherein the said portion of the annular gasket extends between the outer perimeter and an inner perimeter of the molding cavity, each said perimeter being formed as part of a respective one of the dies.

8. An assembly in accordance with claim 2, wherein the annular gasket itself embraces the convex die.

9. An assembly in accordance with claim 8, the annular gasket having an annular skirt received on the convex dies in the closed position of the molding assembly.

10. An assembly in accordance with claim 1, wherein the annular gasket is formed in one piece with the convex die.

11. An assembly in accordance with claim 8 or 10, wherein the gasket is integrally formed with a skirt which is received on the concave die in the closed position of the assembly.

* * * * *